United States Patent Office 3,083,201
Patented Mar. 26, 1963

3,083,201
GLYOXAL DERIVATIVES OF DIBENZOFURAN AND DIBENZOTHIOPHENE
Elvin L. Anderson, Moorestown, N.J., assignor to Smith Kline & French Laboratories, Philadelphia, Pa., a corporation of Pennsylvania
No Drawing. Filed Feb. 13, 1961, Ser. No. 88,616
9 Claims. (Cl. 260—240)

This invention relates to novel glyoxal derivatives of dibenzofuran and dibenzothiophene. More specifically, this invention relates to mono- and bisglyoxalyl derivatives and their corresponding hydrates, alcoholates, alkali metal bisulfite salts and carbonyl functional derivatives.

The novel dibenzofuran and dibenzothiophene glyoxal derivatives of this invention are useful as antiviral agents, particularly in infections such as distemper virus, influenza virus ($PR_8$), hepatitis virus ($MHV_3$), neurotropic virus (CLM), herpes simplex, adenovirus, Newcastle disease virus, Coxsackie virus, Echo virus and hemadsorption virus; especially influenza and herpetic viruses. In addition, these compounds have a low order of toxicity.

The glyoxal derivatives of this invention are represented by the following fundamental formula:

Formula I

[Structure: dibenzofuran/thiophene ring system with positions 1-9 labeled, X at position 5-6, R substituent, and $-C(=O)-R_1$ group]

where X represents O, S, SO, $SO_2$;

R represents hydrogen or $-\overset{O}{\underset{\|}{C}}-R_1$; and
$R_1$ represents
—CHO
—CH—OH
  |
  $SO_3M$
where M is a nontoxic alkali metal, preferably sodium or potassium, —CH—OH where $R_2$ is hydrogen or a hydrocarbon radical con-
  |    taining from 1 to 12 atoms inclusive,
  $OR_2$ —Y—⟨benzene⟩ where Y is $-CH-NH-$ or $-CH=N-$
                       |
                       $OR_2$
and $R_2$ is as defined above, $COOR_3$
—Y—⟨benzene⟩     where Y is a defined above,
          $R_4$ $R_3$ is hydrogen or lower alkyl of from 1 to 4 carbon atoms and $R_4$ is hydrogen or hydroxy,

—CH=N—⟨S⟩

—CH=N—NH—CO—⟨N⟩

—CH=N—CO—$CH_2$—$\overset{\oplus}{N}$⟨ ⟩ .Cl⊖ or

—CH⟨NH—⟨ ⟩⟩
           $COOH$/$_2$

Advantageous compounds of this invention are represented by the following fundamental formula:

Formula II

[Structure: dibenzofuran/thiophene ring system with R, X, and $-C(=O)-R_1$ substituents]

where X represents O or S

R represents hydrogen or $-\overset{O}{\underset{\|}{C}}-R_1$; and
$R_1$ represents
—CHO
—CH—OH
  |
  $SO_3Na$ —CH—OH where $R_2$ is hydrogen, a lower saturated or unsaturated
  |
  $OR_2$
aliphatic hydrocarbon radical of from 1 to 8 carbon atoms, inclusive, or a benzyl radical, —Y—⟨benzene⟩ where Y is $-CH-NH-$ or $-CH=N-$ and $R_2$
                       |
                       $OR_2$
is as defined immediately above, —Y—⟨benzene⟩—$COOR_3$ where Y is as defined immediately
          $R_4$
above, $R_3$ is hydrogen or lower alkyl of from 1 to 4 carbon atoms and $R_4$ is hydrogen or hydroxy, —CH=N—⟨S⟩ or

—CH(NH—⟨ ⟩—COOH)$_2$

Preferred compounds of this invention are represented by Formula II above where

R represents hydrogen or $-\overset{O}{\underset{\|}{C}}-R_1$; and
$R_1$ represents
—CH—OH
  |
  OH —Y—⟨benzene⟩—COOH where Y is $-CH-NH-$ or
                            |
                            $OR_2$ —CH=N— and $R_2$ is hydrogen or lower alkyl of from 1 to 8 carbon atoms, particularly methyl or ethyl, or

—CH(NH—⟨ ⟩—COOH)$_2$

The glyoxal derivatives of this invention are readily prepared from the corresponding mono- or diacetyl dibenzofurans and dibenzothiophenes by oxidation with an agent such as selenium dioxide. The acetyl dibenzofuran and dibenzothiophene starting materials are obtained by a Friedel-Crafts acylation with acetyl chloride under standard conditions (aluminum chloride in carbon disulfide).

The mono- or diacetyl dibenzofuran or dibenzothiophene is reacted with selenium dioxide in a suitable organic solvent such as dioxane, tetrahydrofuran, acetone, ethanol, benzene and the like. Theoretically one or two moles of selenium dioxide is required for one mole of mono- or diacetyl dibenzofuran or dibenzothiophene, respectively. However, an excess such as from about 1.25 to about 5 moles or from about 3 to about 7 moles of oxidizing agent is employed for each mole of starting material. The reaction is carried out at a temperature in the range of from about 30° C. up to the boiling point of the solvent used and for from about 30 minutes to 8 hours. Preferably the reaction is carried out at from about 50–100° C. for about 1 to 6 hours. Filtering the reaction mixture and adding water to the filtrate yields the dibenzofuran and dibenzothiophene glyoxal hydrates. Oxidation under anhydrous conditions, such as an anhydrous dioxane, yields the anhydrous glyoxals.

Alternatively, the glyoxal derivatives of this invention are prepared from corresponding mono- or bis-haloacetyl or dihaloacetyl dibenzofurans or dibenzothiophenes obtained by Friedel-Crafts acylation with haloacetyl or dihaloacetyl halide. Preferably the halogen is chlorine or bromine. Also, the dihaloacetyl derivatives are prepared by direct halogenation of the mono- or diacetyl dibenzofuran or dibenzothiophene, preferably with chlorine or bromine, in an unreactive organic solvent such as chloroform, carbon tetrachloride, methylene chloride and the like, or preferably glacial acetic acid. The haloacetyl dibenzofuran or dibenzothiophene is converted to the glyoxal via the Sommelet reaction, that is refluxing the halide with hexamethylenetetramine followed by decomposition of the quaternary ammonium salt with water. The dihaloacetyl dibenzofuran or dibenzothiophene is converted to the glyoxal by reaction with an alkali metal alcoholate such as sodium or potassium methylate or ethylate in a suitable solvent, usually anhydrous lower alcohol, to form the corresponding glyoxalyl acetyl derivatives. The reaction is preferably run at about 40-60° C. for from 1-3 hours with the reaction mixture maintained at pH 7. The acetal compound is then hydrolyzed with dilute acid such as 3% sulfuric or hydrochloric acid in a suitable solvent such as acetic acid to form the glyoxalyl derivative.

The dibenzothiophene-5-oxide and 5,5-dioxide glyoxals of this invention are prepared by standard oxidation of the mono- or diacetyl dibenzothiophenes with hydrogen peroxide followed by oxidation of the acetyl moiety as described above with selenium dioxide.

The hydrate or alcoholate derivatives of this invention are prepared from the anhydrous glyoxal by reaction with water or an alcohol, usually at room or slightly elevated temperature such as up to about 100° C. for from about 10 minutes to about 10 hours.

The alcoholates are advantageously prepared by reacting the anhydrous glyoxal or hydrate thereof with an alcohol, usually in an excess of the alcohol with gentle heating between from about 50° C. to about 80° C. Alternatively, the glyoxal hydrate can be heated in an excess of an anhydrous alcohol with azeotropic removal of the water formed employing an organic solvent such as benzene, xylene or toluene, to give the desired alcoholate.

The glyoxal alkali metal bisulfite salts of this invention are prepared by reacting the glyoxal, anhydrous or hydrated, with approximately an equimolar amount of preferably sodium or potassium bisulfite.

The aminocarbinol derivatives of Formula I where Y is

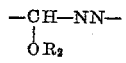

are prepared by condensing either the dibenzofuran or dibenzothiophene glyoxal alcoholate or hydate with an aniline, aminobenzoic acid or aminosalicylic acid, or lower alkyl esters thereof, with elimination of water. Advantageously, approximately molar equivalent amounts of the glyoxalyl alcoholate or hydrate and the amino reactant (2 moles per 1 mole of bisglyoxalyl dibenzofuran or dibenzothiophene) in an inert organic solvent are reacted at from about 25° C. to about the boiling point of the solvent employed for from about 15 minutes to about 24 hours. Preferably the reaction time is from about 30 minutes to 8 hours at temperatures from about 40°–100° C. Using the glyoxalyl alcoholate as the starching material, it is advantageous to use the corresponding anhydrous alcohol as the reaction solvent. It is often advantageous to prepare the glyoxalyl alcoholate in situ from the corresponding hydrate by a brief reflux in the desired alcohol in the presence of sulfuric acid. The aminocarbinol condensation derivative is usually isolated by filtration or evaporation of the solvent.

The methyleneimino derivatives of Formula I where Y is —CH=N— are prepared by decomposition of the corresponding aminocarbinol derivatives prepared as described above. The decomposition is accomplished by heating the aminocarbinol to a temperature of from about 70° C. to about 140° C., preferably under reduced pressure of about 0.01-15 mm. of mercury and in the absence of solvent in an anhydrous atmosphere. Although the time necessary for decomposition is variable, at 100-120° C. and a pressure of 0.1-15 mm. of mercury the reaction is complete in about 1-10 hours. Alternatively the decomposition is accomplished at atmospheric pressure by infrared heating at 100-150° C.

The methyleneimino derivatives are alternatively prepared by reacting the anhydrous dibenzofuran or dibenzothiophene glyoxal with an aniline, aminobenzoic acid or aminosalicylic acid, or lower alkyl esters thereof. The reaction is carried out in the absence of solvents or in an inert, anhydrous organic solvent such as toluene or xylene. In the absence of a solvent, the reaction is carried out at from about 90°–125° C. for about from 6-10 hours. When a solvent is employed the reaction is conveniently run at the reflux temperature of the solvent for from about 6-10 hours.

The cyclohexyliminomethylene derivatives of Formula I are prepared by condensing either the dibenzofuran or dibenzothiophene glyoxal or its alcoholate or hydrate with cyclohexylamine in a suitable organic solvent such as a lower alkanol, an ether for example ethyl ether, dioxane or tetrahydrofuran, a hydrocarbon for example benzene or toluene, or a halogenated solvent for example chloroform, carbon tetrachloride and the like. Preferably the solvent is a lower alkanol, especially isopropyl alcohol. The condensation is advantageously carried out at relatively low temperatures such as from about —10° C. to about 40° C. for from about 10-60 minutes. The product is isolated by filtration or evaporation of the solvent.

The isonicotinoyl hydrazone derivatives of Formula I are prepared by condensing either the dibenzofuran or dibenzothiophene glyoxal or its alcoholate or hydrate with isonicotinic acid hydrazide in an organic solvent of the alcoholic type or in an inert one such as ether, benzene, dioxane, tetrahydrofuran and the like. The reaction temperature is in the range of from 20–25° C. up to the boiling point of the solvent employed, preferably between about 50° C. and 100° C. Generally the reaction is complete in about 2-8 hours with the product isolated by filtration of the precipitate.

The methinylhydrazidomethylpyridinium chloride derivatives of Formula I are prepared by condensing either the dibenzofuran or dibenzothiophene glyoxal or its alcoholate or hydrate with acethydrazide pyridinium chloride in an unreactive organic solvent, preferably a lower alkanol, for example methanol, ethanol or isopropanol. Advantageously a condensing agent such as acetic acid is present. The reaction is usually complete in from about 30 minutes to about four hours at the reflux temperature of the solvent employed. The product is isolated by cooling or by evaporation of the solvent.

The bis aminobenzoic acid adducts of Formula I are prepared by condensing either the dibenzofuran or dibenzothiophene glyoxal or its hydrate with an excess of the aminobenzoic acid in preferably an alcoholic type solvent, for example methanol or ethanol. The reaction is usually carried out at the reflux temperature of the solvent for from 30 minutes to 8 hours. The product is isolated by cooling and filtering.

The novel compounds of this invention described fully above are useful as prophylactic agents and chemotherapeutic drugs for the treatment of viral infections and diseases. Some of these compounds also have a specialized utility. For example the methinylhydrazidomethylpyridinium salts are very water soluble thereby lending themselves in particular to subcutaneous administration or topical applications, for example in the form of a collyrium. Further the isonicotinoyl hydrazones are particularly useful in the treatment of viral infections and diseases of the skin and eyes.

From the above description it is obvious that one skilled in the art can design minor variations of this invention. Such variations are intended to be included in the scope of this invention as equivalents to the basic invention herein fully described. For example the compounds of Formula I where $R_1$ represents

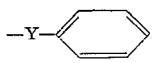

the benzene ring may be substituted by nitro, sulfamido, amino, methylamino, acetylamino, hydroxy, methoxy, acetoxy, halogen or methyl radicals and the like. Further, in addition to the methinylhydrazidomethylpyridinium chloride derivatives of Formula I other methinylhydrazidomethyl quaternary salts may be employed such as trimethylammonium, methylpyridinium, methylpyrrolidinium, methylmorpholinium, methyl- and dimethyl-N-methylpiperazinium chlorides or bromides. In general, $R_1$ as described represents aldehydo derived moieties having a maximum of 20 carbon atoms.

The following specific examples are not limiting but illustrate the novel compounds of this invention and make fully apparent the practice of this invention to one skilled in the art.

Example 1

To a solution of 80 ml. of dioxane and 2.4 ml. of water is added 20 g. of 2,8-diacetyl-dibenzofuran and 18.5 g. of selenium dioxide. After refluxing for 1.5 hours, the mixture is cooled to 25° C. and filtered. The filtrate is poured into 200 ml. of water and the resulting solid is recrystallized from glacial acetic acid to give dibenzofuran-2,8-diglyoxal monohydrate M.P. 120–123° C.

Similarly, running the above reaction in anhydrous dioxane under anhydrous conditions, filtering the hot reaction mixture, concentrating and cooling gives anhydrous dibenzofuran-2,8-diglyoxal.

Example 2

To a solution of 100 ml. of dioxane and 3 ml. of water is added 21.1 g. of 2-acetyl dibenzofuran and 11.5 g. of selenium dioxide. After refluxing for 1.5 hours, the mixture is cooled and filtered. The filtrate is treated with 300 ml. of water, extracted with ether and the ether extracts dried over magnesium sulfate. The ether is removed and to the residue is added 13.9 g. of sodium bisulfite dissolved in 50 ml. of water. The solution is heated on the steam bath for 15 minutes, cooled to 10° C. and filtered. The solid is washed with water (200 ml.) and acetone (200 ml.) to give dibenzofuran-2-glyoxal bisulfite, sodium salt M.P. 215° C.

Example 3

To a suspension of 70 g. of dibenzofuran-2-glyoxal bisulfite, sodium salt in 440 ml. of water is added 440 ml. of 10% hydrochloric acid. After heating on the steam bath four hours, the mixture is cooled to 25° C. and filtered. The solid is recrystallized from aqueous acetic acid to give dibenzofuran-2-glyoxal hydrate M.P. 135–137° C.

Example 4

To 13 g. of dibenzofuran-2-glyoxal hydrate in 120 ml. of ethanol is added one drop of concentrated sulfuric acid. After refluxing for 15 minutes, 7.2 g. of p-aminobenzoic acid is added and refluxing continued for 30 minutes. The precipitated solid is filtered hot and de-ethoxylated by heating in a vacuum oven for 4 hours at 105° C. After washing in ethyl ether (120 ml.), there is obtained N-(2-dibenzofuranylglyoxylidene) - p - aminobenzoic acid hemihydrate M.P. 225–227° C.

Example 5

A suspension of 22.2 g. of selenium dioxide, 9 ml. of water and 235 ml. of dioxane is heated with stirring to 60° C. after which 41.2 g. of 2-acetyldibenzothiophene is added. The mixture is heated at reflux for five hours. The reaction mixture is cooled to about 80° C., filtered and allowed to stand overnight. The solution is again heated to boiling and filtered. The crude product which precipitates is recrystallized twice from acetic acid and water to yield yellow dibenzothiophene-2-glyoxal hemihydrate which decomposes at 135–141° C.

Running the above reaction in dioxane under anhydrous conditions, filtering the hot reaction mixture, condensing and cooling gives anhydrous dibenzothiophene-2-glyoxal.

Example 6

A solution of 11.5 g. of dibenzothiophene-2-glyoxal hemihydrate and 7.1 g. of p-aminobenzoic acid in 200 ml. of benzene is boiled under reflux for 2¾ hours. The reaction mixture is cooled to about 10° C. and filtered and yields pale yellow 2-[bis-(4-carboxyphenylamino)acetyl] dibenzothiophene that decomposes at 222–4° C. It is slurried in acetone and washed with acetone to yield product that melts at 225–8° C. (dec.).

Example 7

A mixture of 10.0 g. of dibenzofuran-2-glyoxal hydrate, made as in Example 3, in 150 ml. of absolute ethanol is heated at reflux for several hours. The clear solution is evaporated slightly and then cooled to give dibenzofuran-2-glyoxal ethylate.

Similarly, by following the above procedure 10.0 g. of dibenzofuran-2-glyoxal hydrate is reacted with an excess of other alcohols to give the corresponding methylate, n-propylate, isopropylate, n-butylate, allylate, propargylate and the like of dibenzofuran-2-glyoxal.

Example 8

To 12.0 g. of dibenzofuran-2-glyoxal hydrate in 125 ml. of ethanol is added one drop of concentrated sulfuric acid. The mixture is refluxed for 15 minutes to form the dibenzofuran-2-glyoxal ethylate and then 6.7 g. of p-aminobenzoic acid is added. The refluxing is continued for 30 minutes and the precipitated solid is filtered hot to give the ethyl ether of α-(2-dibenzofurancarbonyl)-α-(4-carboxyphenylamino)-carbinol.

A portion of the ethyl ether (500 mg.) is dissolved in water containing one molar equivalent of sodium hydroxide to give the sodium salt upon evaporation.

Similarly, reacting any of the alcoholates of Example 7 according to the above procedure with one molar equivalent of p-aminobenzoic acid gives the corresponding ethers of α-(2-dibenzofurancarbonyl)-α-(4-carboxyphenylamino)-carbinol.

Example 9

The ethyl ether of α-(2-dibenzofurancarbonyl)-α-(4-carboxyphenylamino)-carbinol (5.0 g., Example 8) is heated in a vacuum oven at 0.1 mm. and 105° C. for four hours to give, after washing with acetone, N-(2-dibenzofuranylglyoxylidene)-p-aminobenzoic acid.

Example 10

A solution of 13.4 g. of 2,8-diacetyldibenzothiophene in 125 ml. of dioxane and 5 ml. of water is treated with 11.5 g. of selenium dioxide and then refluxed for two hours. The cooled reaction mixture is filtered and the filtrate is diluted with water to precipitate dibenzothiophene-2,8-diglyoxal hydrate.

Reacting the product with an excess of sodium bisulfite in water-dioxane gives the corresponding bis sodium bisulfite salt.

Example 11

A solution of 10.0 g. of 2-acetyldibenzothiophene in 100 ml. of acetic acid is treated with an excess of hydrogen peroxide and warmed to 40° C. Diluting the mixture with water precipitates 2-acetyldibenzothiophene-5,5-dioxide.

The filtered dioxide is dissolved in 125 ml. of glacial acetic acid with heating and then cooled to 50° C. Chlorine gas is then bubbled into the mixture for four hours until the theoretical amount of chlorine is dissolved. The reaction mixture is poured into water and extracted with methylene chloride. Evaporation of the dried extract yields 2-dichloroacetyldibenzothiophene-5,5-dioxide.

A solution of the dichloroacetyl compound (5.0 g.) is dissolved in 75 ml. of hot anhydrous methanol and treated with a solution of 1.0 g. of sodium in 25 ml. of methanol. After four hours at 45–50° C. the reaction mixture is neutral to phenolphthalein and the sodium chloride is filtered off. Evaporation of the solvent gives the residual 2-glyoxalyldibenzothiophene-5,5-dioxide methyl acetal. The acetal is dissolved in 50 ml. of acetic acid at 50° C. and 3 ml. of 3% sulfuric acid is added. Water is added and the precipitate water-washed to give 2-glyoxalyldibenzothiophene-5,5-dioxide hydrate.

Similarly, by following the above procedure 10.0 g. of 2-acetyldibenzothiophene in 100 ml. of acetic acid is oxidized at ambient temperature with one molar equivalent of hydrogen peroxide to give 2-acetyldibenzothiophene-5-oxide which is converted to 2-glyoxalyldibenzothiophene-5-oxide.

Example 12

A mixture of 5.0 g. of dibenzothiophene-2,8-diglyoxal hydrate, prepared as in Example 10, and 100 ml. of anhydrous n-octyl alcohol in 250 ml. of anhydrous benzene is heated at reflux for 12 hours over a water trap (Org. Syn. 3, 382) having an inner funnel containing a mixture of phosphorus pentoxide and a filter aid. The mother liquor is then concentrated in vacuo to give the bis n-octylate of dibenzothiophene-2,8-diglyoxal.

Similarly, by following the above procedure 5.0 g. of dibenzothiophene-2,8-diglyoxal hydrate is reacted with an excess of other alcohols to give the corresponding bis n-hexylate, cyclohexylate, citronellylate, phenylate and benzylate of dibenzothiophene-2,8-diglyoxal.

Example 13

A solution of 13.4 g. of dibenzofuran-2-glyoxal methylate (prepared as in Example 7) in 150 ml. of methanol is treated with 4.7 g. of aniline and refluxed for one hour. Cooling separates the methyl ether of α-(2-dibenzofurancarbonyl)-α-(phenylamino)-carbinol.

Similarly, reacting any of the alcoholates of Example 2 as described above with one molar equivalent of aniline gives the corresponding ethers of α-(2-dibenzofurancarbonyl)-α-(phenylamino)-carbinol.

Example 14

A mixture of 11.5 g. of anhydrous dibenzothiophene-2-glyoxal, prepared as in Example 5, 4.5 g. of aniline and 250 ml. of anhydrous xylene is heated at reflux for eight hours. The precipitate is filtered and dried to give N-(2-dibenzothiophenylglyoxylidene)-aniline.

Example 15

A mixture of 14.3 g. of dibenzofuran-2-glyoxal ethylate (Example 7) and 8.3 g. of ethyl p-aminobenzoate in 300 ml. of ethanol is heated at reflux for three hours. Evaporation of the solvent and cooling separates the ethyl ether of α-(2-dibenzofurancarbonyl) - α - (4-carbethoxyphenylamino)-carbinol.

Example 16

A mixture of 12.2 g. of anhydrous dibenzothiophene-2-glyoxal (Example 5), 6.9 g. of o-aminobenzoic acid and 200 ml. of anhydrous toluene is refluxed for 10 hours. The precipitate obtained is N-(2-dibenzothiophenylglyoxylidene)-o-aminobenzoic acid.

Example 17

A mixture of 13.0 g. of dibenzofuran-2-glyoxal hydrate (Example 3) and 6.9 g. of p-aminobenzoic acid in 100 ml. of benzene is warmed on the steam bath for two hours to give α-(2-dibenzofurancarbonyl)-α-(4-carboxyphenylamino)-carbinol.

Example 18

A solution of 2.0 g. of dibenzofuran-2-glyoxal hydrate and 1.5 g. of p-aminosalicylic acid in 75 ml. of tetrahydrofuran is refluxed for three hours, cooled and filtered to give α-(2-dibenzofurancarbonyl)-α-(4-carboxy-3-hydroxyphenylamino)-carbinol.

Similarly, reacting 2.0 g. of dibenzofuran-2-glyoxal hydrate and 1.67 g. of methyl p-aminosalicylate yields α-(2-dibenzofurancarbonyl) - α - (4 - carbomethoxy - 3 - hydroxyphenylamino)-carbinol.

Example 19

To a solution of 3.0 g. of dibenzofuran-2-glyoxal ethylate in 50 ml. of anhydrous ethanol is added 1.5 g. of p-aminosalicylic acid and the mixture is refluxed for four hours. Cooling yields the crystalline α-(2-dibenzofurancarbonyl) - α - (4 - carboxy - 3 - hydroxyphenylamino)-carbinol ethyl ether.

A portion of the ethyl ether (500 mg.) is dissolved in one molar equivalent of aqueous sodium hydroxide solution and then evaporated to give the sodium salt.

Example 20

A solution of 3.0 g. of dibenzofuran-2,8-diglyoxal hydrate (Example 1) in 150 ml. of absolute ethyl alcohol is heated at reflux for four hours, concentrated and cooled to give 2,8-bisglyoxalyldibenzofuran diethylate.

Example 21

To a solution of 3.8 g. of 2,8-bisglyoxalyldibenzofuran diethylate (Example 20) in 100 ml. of ethanol is added 3.3 g. of p-aminobenzoic acid and the mixture is heated at reflux for six hours. Cooling and filtering the reaction mixture yields 2,8-bis[α-ethoxy-α-(4-carboxyphenylamino)acetyl]-dibenzofuran.

Example 22

The ethyl ether of α-(2-dibenzofurancarbonyl)-α-(4-carboxyl-3-hydroxyphenylamino)-carbinol (1.0 g., Example 19) is heated at 0.1 mm. and 100–110° C. for four hours to give p-amino-o-hydroxy-N-(2-dibenzofuranylglyoxylidene)benzoic acid.

Example 23

A solution of 2.7 g. of dibenzofuran-2-glyoxal hydrate in 15 ml. of isopropanol is cooled to 0° C. and treated with a solution of 1.0 g. of cyclohexylamine in 5 ml. of isopropanol. After stirring at this temperature for one hour, the reaction mixture is concentrated in vacuo and the precipitate filtered to yield N-(2-dibenzofuranylglyoxylidene)cyclohexylamine.

Similarly, reacting 2.8 g. of dibenzothiophene-2-glyoxal hydrate with 2.0 g. of cyclohexylamine at 0° C. yields the corresponding N-(2-dibenzothiophenylglyoxylidene) cyclohexylamine.

Example 24

A mixture of 2.7 g. of dibenzofuran-2-glyoxal hydrate and 1.37 g. of isonicotinic acid hydrazide in 100 ml. of ethanol is refluxed for three hours. Cooling separates the crystalline isonicotinoyl hydrazone of dibenzofuran-2-glyoxal.

Similarly, reacting 3.3 g. of dibenzothiophene-2,8-diglyoxal hydrate with 2.7 g. of isonicotinic acid hydrazide yields the bis isonicotinoyl hydrazone of dibenzothiophene-2,8-diglyoxal.

Example 25

A mixture of 2.5 g. of dibenzothiophene-2-glyoxal hydrate, 2.0 g. of acethydrazide pyridinium chloride, 5 ml. of glacial acetic acid and 25 ml. of absolute ethanol is heated at reflux for three hours. The mixture is concentrated and cooled to give the solid [(2-dibenzothiophenecarbonyl)methinylhydrazidomethyl]pyridinium chloride.

Similarly, reacting 2.5 g. of dibenzothiophene-2-glyoxal hydrate as described above with 1.8 g. of acethydrazide trimethylammonium chloride yields [(2-dibenzothiophenecarbonyl)methinylhydrazidomethyl] - trimethylammonium chloride.

Example 26

A mixture of 3.3 g. of dibenzofuran-2,8-diglyoxal hydrate, 4.0 g. of acethydrazide pyridinium chloride, 5 ml. of acetic acid and 50 ml. of ethanol is refluxed for two hours, concentrated and cooled to yield 2,8-bis(carbonylmethinylhydrazidomethylpyridinium chloride)-dibenzofuran.

Example 27

The 2,8-bis[α-ethoxy-α-(4 - carboxyphenylamino) - acetyl]-dibenzofuran of Example 21 (1.5 g.) is heated at 0.1 mm. and 100–110° C. for six hours to yield 2,8-bis[(4-carboxyphenyl)-iminoglyoxylidene]-dibenzofuran.

Example 28

To 15.3 g. of 2-glyoxalyldibenzothiophene-5,5-dioxide hydrate (Example 11) in 150 ml. of ethanol is added one drop of concentrated sulfuric acid. The mixture is refluxed for 30 minutes to form the 2-glyoxalyldibenzothiophene-5,5-dioxide ethylate and then 6.7 g. of p-aminobenzoic acid is added. The refluxing is continued for one hour and the solid filtered off to give 2-[α-ethoxy-α-(4-carboxyphenylamino)acetyl]-dibenzothiophene-5,5-dioxide.

Example 29

A solution of 2.7 g. of dibenzofuran-2-glyoxal ethylate (Example 3) in 50 ml. of methanol is treated with 1.4 g. of p-nitroaniline and refluxed for two hours. Cooling separates the ethyl ether of α-(2-dibenzofurancarbonyl)-α-(4-nitrophenylamino)-carbinol.

Similarly, reacting 2.7 g. of dibenzofuran-2-glyoxal ethylate as described above with 1.1 g. of p-aminoaniline, 1.1 g. of p-hydroxyaniline or 1.6 g. of 3,4-dichloroaniline yields the corresponding amino-, hydroxy-, or 3,4-dichlorophenylamino dibenzofurancarbonyl carbinol ethyl ethers.

Example 30

To a solution of 5 ml. of water and 150 ml. of dioxane is added 11.1 g. of selenium dioxide and 20.0 g. of 3-acetyldibenzothiophene. Refluxing for four hours and working up as in Example 1 gives dibenzothiophene-3-glyoxal hydrate.

Similarly by using 20.0 g. of 3-acetyldibenzofuran, the product is dibenzofuran-3-glyoxal hydrate.

What is claimed is:

1. A chemical compound of the formula:

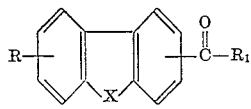

in which:
X is a member selected from the group consisting of O, S, SO and SO₂;
R is a member selected from the group consisting of hydrogen and $$-\overset{O}{\underset{\|}{C}}-R_1; \text{ and}$$

R₁ is a member selected from the group consisting of

—CHO

—CH—OH is which M is a nontoxic alkali metal,
 |
 SO₃M

—CH—OH in which R₂ is a member selected from the group consisting of hydrogen, alkyl of from 1 to 12 carbon atoms inclusive and benzyl,
 |
 OR₂

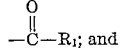 in which Y is a member selected from the group consisting of —CH—NH— and —CH=N— and R₂ is as defined above,
 |
 OR₂

 in which Y is as defined above, R₃ is a member

selected from the group consisting of hydrogen and lower alkyl having from 1 to 4 carbon atoms and R₃ is a member selected from the group consisting of hydrogen and hydroxy,

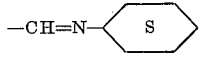

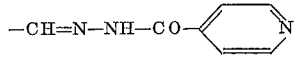

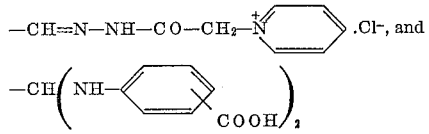

2. The chemical compound of the formula:

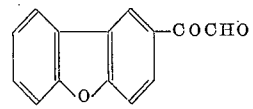

3. The chemical compound of the formula:

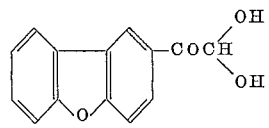

4. The chemical compound of the formula:

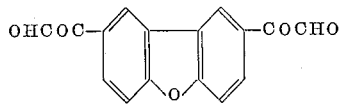

5. The chemical compound of the formula:

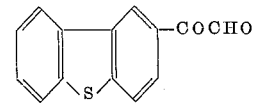

6. The chemical compound of the formula:

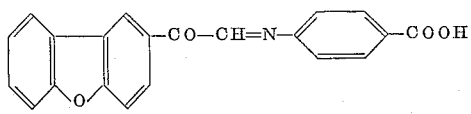

7. The chemical compound of the formula:

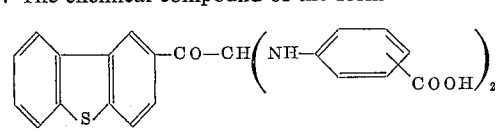

8. A chemical compound of the formula:

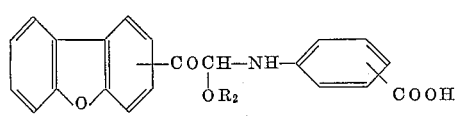

in which R₂ is alkyl of from 1 to 8 carbon atoms inclusive.

9. The chemical compound of the formula:

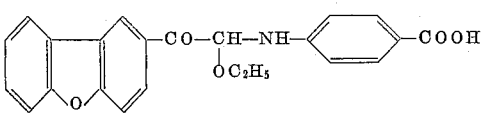

References Cited in the file of this patent

Burger et al. J. Am. Chem. Soc., vol 63, pp. 1054–6 (1941).

Bergmann: The Chemistry of Acetylene and Related Compounds, p 80 (1948).

Elderfield: Heterocyclic Compounds, vol. 2, p. 143 (1951).

Gilman et al.: J. Am. Chem. Soc., vol. 75, p. 6310 (1953).